(12) United States Patent
Hong

(10) Patent No.: US 7,256,958 B2
(45) Date of Patent: Aug. 14, 2007

(54) LOADING GEAR SUPPORTING APPARATUS OF VIDEO CASSETTE RECORDER

(75) Inventor: Sung-Pyo Hong, Suwon (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 10/756,460

(22) Filed: Jan. 14, 2004

(65) Prior Publication Data

US 2004/0184182 A1 Sep. 23, 2004

(30) Foreign Application Priority Data

Jan. 22, 2003 (KR) ............... 10-2003-0004373

(51) Int. Cl.
*G11B 5/027* (2006.01)
*G11B 15/675* (2006.01)

(52) U.S. Cl. ............ 360/85; 360/96.5; 360/96.6; 360/83; 360/80; 360/93; 360/90

(58) Field of Classification Search ............ 360/85, 360/90, 93, 65, 95, 96.1
See application file for complete search history.

(56) References Cited

U.S. PATENT DOCUMENTS

| | | | | |
|---|---|---|---|---|
| 4,353,101 A | * | 10/1982 | Kawai | 360/85 |
| 4,577,246 A | * | 3/1986 | Matsuki | 360/96.5 |
| 4,814,911 A | * | 3/1989 | Naoi et al. | 360/85 |
| 5,065,264 A | * | 11/1991 | Ohmori et al. | 360/85 |
| 5,428,488 A | * | 6/1995 | Lee | 360/84 |
| 5,434,726 A | * | 7/1995 | Song | 360/85 |
| 5,499,777 A | * | 3/1996 | Ahn | 242/356 |
| 5,548,456 A | * | 8/1996 | Jin | 360/85 |
| 5,597,130 A | * | 1/1997 | Chiu et al. | 242/356 |
| 5,621,585 A | * | 4/1997 | Kang et al. | 360/85 |
| 6,256,167 B1 | * | 7/2001 | Konishi et al. | 360/130.23 |
| 2004/0062170 A1 | * | 4/2004 | Choi et al. | 369/69 |

FOREIGN PATENT DOCUMENTS

| | | | |
|---|---|---|---|
| EP | 1435613 A2 | * | 7/2004 |
| EP | 1435614 A2 | * | 7/2004 |
| JP | 63225960 A | * | 9/1988 |
| JP | 02009049 A | * | 1/1990 |
| JP | 05114213 A | * | 5/1993 |

* cited by examiner

*Primary Examiner*—Wayne Young
*Assistant Examiner*—Matthew G. Kayrish
(74) *Attorney, Agent, or Firm*—Birch, Stewart, Kolasch & Birch, LLP

(57) ABSTRACT

Disclosed is a loading gear supporting apparatus of a video cassette recorder which can assemble a loading gear supporting member which supports a pole base loading gear, a first loading gear, and a second loading gear to a deck more simply. To this end, a locking protrusion and a locking groove are respectively formed at the deck and the loading gear supporting member to elastically engage the locking protrusion to the locking groove.

5 Claims, 7 Drawing Sheets

LOADING GEAR SUPPORTING APPARATUS OF VIDEO CASSETTE RECORDER

This Non-provisional application claims priority under 35 U.S.C. 119(a) on Patent Application No(s). 10-2003-0004373 filed in Korea on Jan. 22, 2003, the entire contents of which are hereby incorporated by reference.

BACKGROUND OF THE INVENTION

1. Field of the Invention

The present invention relates to a loading gear supporting apparatus of video cassette recorder and particularly, to a loading gear supporting apparatus of a video cassette recorder which can easily assemble a loading gear supporting member which supports a pole base loading gear, a first loading gear, and a second loading gear to a deck.

2. Description of the Related Art

Generally, a video cassette recorder (VCR) includes a tape deck mechanism having a tape loading device, a cassette tape loading device, a tape driving device, a brake operating device, a brake device, a driving force shielding device, and a system control unit for controlling an operation of the tape deck mechanism.

FIGS. 1 and 2 show a driving mechanism of a general VCR, in which FIG. 1 is a plan view showing unloading and FIG. 2 is a plan view showing loading. FIG. 3 is a perspective view showing a loading gear supporting member in a loading gear supporting apparatus of a conventional VCR and FIG. 4 is a longitudinal section view of FIG. 1.

As shown, a cam gear 3 rotated by a cam gear driving motor 2 is installed on a deck (or chassis) of the VCR.

A rotation force of the cam gear 3 is transmitted with a straight-line power on the deck 1, so that a main plate (or a function plate) 4 rotates the pole base loading gear 5.

The pole base loading gear 5 is engaged to a first loading gear so as to rotate it again, and the first loading gear 6 is engaged to a second loading gear 7 so as to rotate it.

A guide roller assembly 8 loads a tape to a head drum 10 along a guide slot(or chassis rail) 9 by the rotation of the first and second loading gears 6 and 7.

Three engaging holes 11, 12, and 13 are formed at a predetermined position of the deck 1, and a bolt hole 14 is formed among the engaging holes 11, 12, and 13.

Three bosses 21, 22, and 23 for fixing (or supporting) the pole base loading gear 5 and first loading gears 6 and second loading gears 7 are formed at a predetermined position of a lower surface of a base 20a corresponding to a body of the loading gear supporting member 20, and the respective bosses 21, 22, and 23 are fitted to the engaging holes 11, 12, and 13.

A guide 24 for guiding a cassette tape to be loaded at the time of loading the cassette tape is formed at a predetermined position of an upper surface of the base 20a, and another bolt hole 25 corresponding to the bolt hole 14 is formed at a middle position of the base 20a.

According to this, the loading gear supporting member 20 is fixed to the deck 1 by engaging the bolt 26 to said two bolt holes 14 and 25.

In the conventional art, the loading gear supporting member was bolt-engaged to the deck, thereby having a difficult assembly process and long assembly time.

Also, in the conventional art, expensive loading gear supporting member made with glass fiber was used to enhance an engaging force with the deck, which caused increase of fabrication cost.

Also, in the conventional art, a thick boss was used to enhance an engaging force with the deck, which caused deformation of the boss.

SUMMARY OF THE INVENTION

Therefore, an object of the present invention is to provide a loading gear supporting apparatus of a video cassette recorder which can simply press-fit the loading gear supporting member to a deck by improving structures of the deck and the loading gear supporting member when the loading gear supporting member is engaged to the deck.

To achieve these and other advantages and in accordance with the purpose of the present invention, as embodied and broadly described herein, there is provided a loading gear supporting apparatus of a video cassette recorder comprising: a loading gear supporting member having a cassette tape guide at an upper surface of a base so as to be inserted to an engaging hole of a deck and having three boss at a lower surface of the base for fixing (or supporting) a pole base loading gear and first and second loading gears; and a loading gear supporting member assembly means for press-fitting said each boss of the loading gear supporting member to the deck by using elasticity force of the base of the loading gear supporting member.

The loading gear supporting member assembly means comprises: an insertion portion elongated at a lower surface of the deck adjacent to the engaging hole; a locking groove formed at a middle portion of the insertion portion; an elasticity portion downwardly curved from the base towards an inner side of the shaft so as to be assembled at a lower portion of the deck; an insertion hole formed between the elasticity portion and the inner wall of the shaft for inserting the insertion portion of the deck; and a locking protrusion formed at a middle portion of the elasticity portion so as to be engaged to the locking groove of the insertion portion.

The insertion portion is cut from a part of the deck and then curved integrally.

An incline plane is formed at an upper surface of the locking protrusion so that the elasticity portion is elastically deformed and the locking protrusion is engaged to the locking groove when the locking protrusion of the elasticity portion is engaged to the locking groove of the insertion portion, and a stopping portion is formed at a lower surface of the locking protrusion so as to prevent the locking protrusion engaged to the locking groove from being detached.

The locking protrusion and the locking groove are formed at end parts of the elasticity portion and the insertion portion.

A plurality of the locking protrusion and the locking groove are formed at the elasticity portion and the insertion portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1 and 2 show a driving mechanism of a general VCR, in which FIG. 1 is a plan view showing unloading and FIG. 2 is a plan view showing loading;

DETAILED DESCRIPTION OF THE PREFERRED EMBODIMENTS

Reference will now be made in detail to the preferred embodiments of the present invention, examples of which are illustrated in the accompanying drawings.

Figure 5:
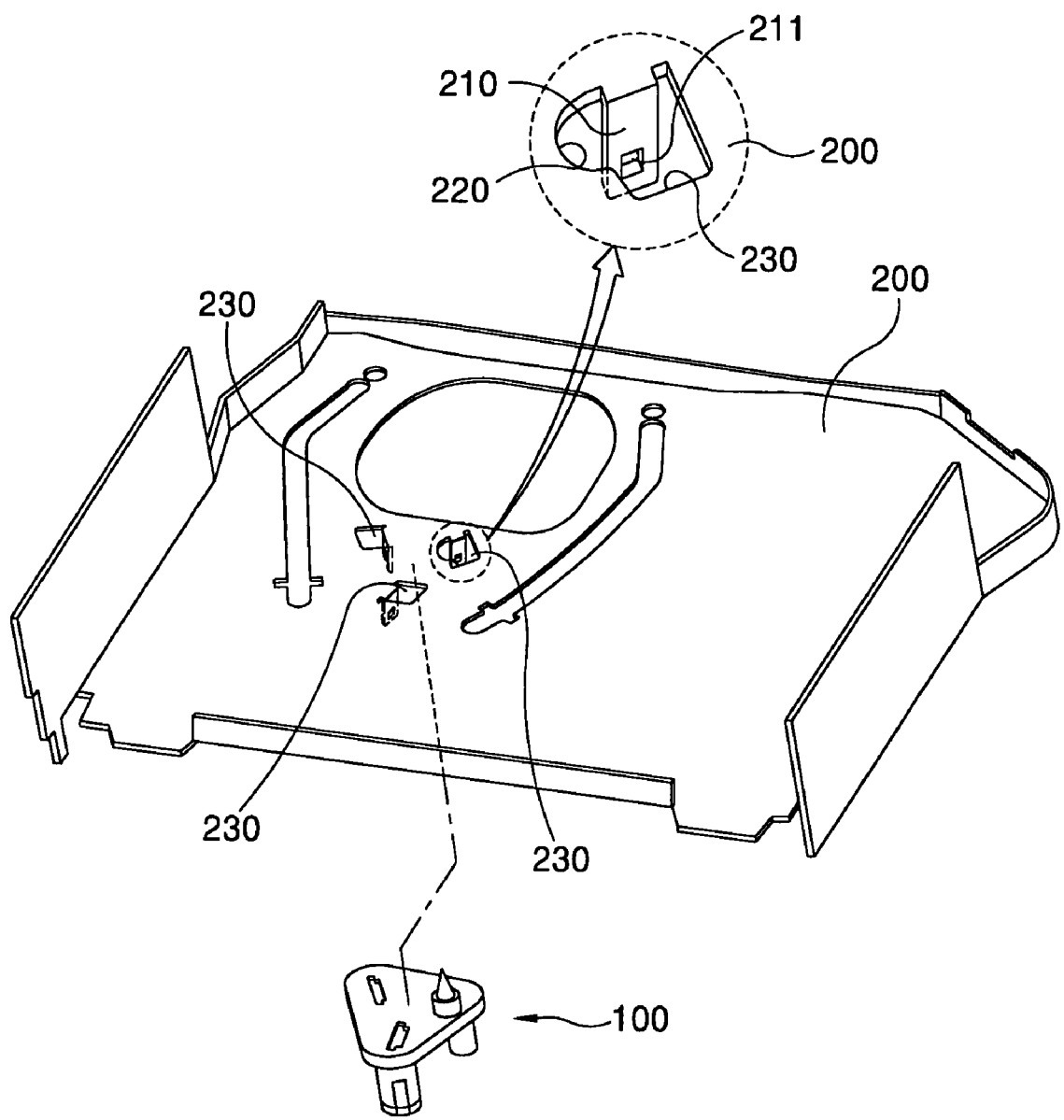
FIG. 5 is a perspective view of a loading gear supporting apparatus of a VCR according to the present invention.
Figure 6:
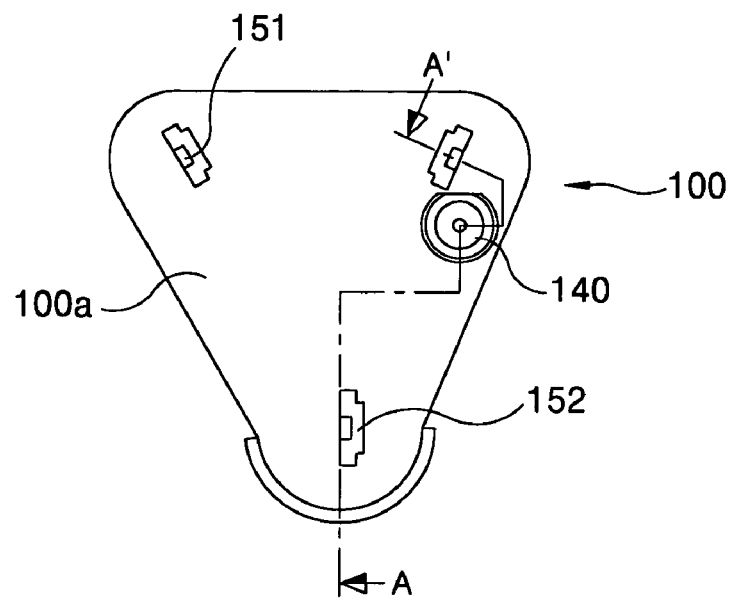
FIG. 6 is a plan view showing the loading gear supporting member of FIG. 5.
Figure 7:
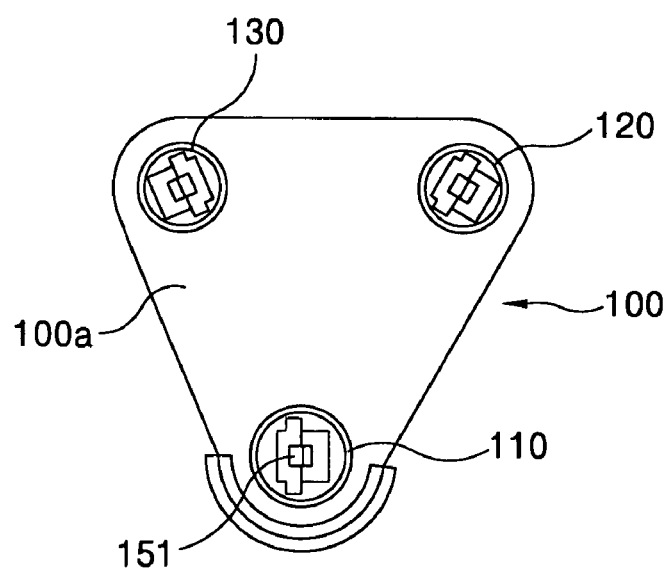
FIG. 7 is a bottom view showing the loading gear supporting member of FIG. 6.
Figure 8:
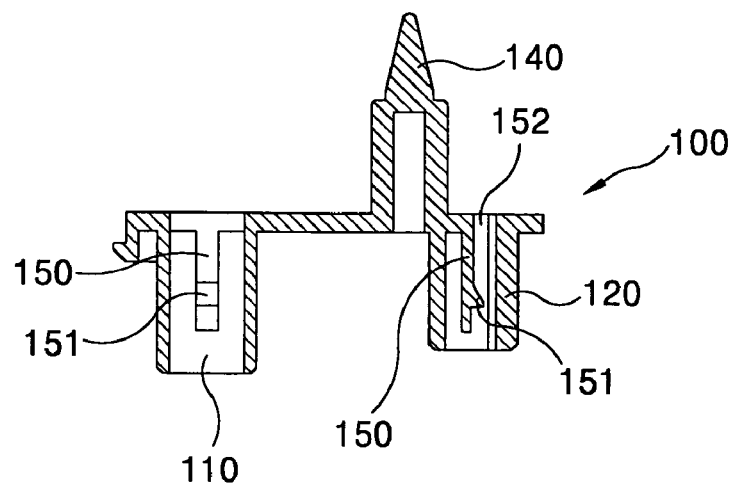
FIG. 8 is a sectional view taken along line A–A' of FIG. 6.
Figure 9:
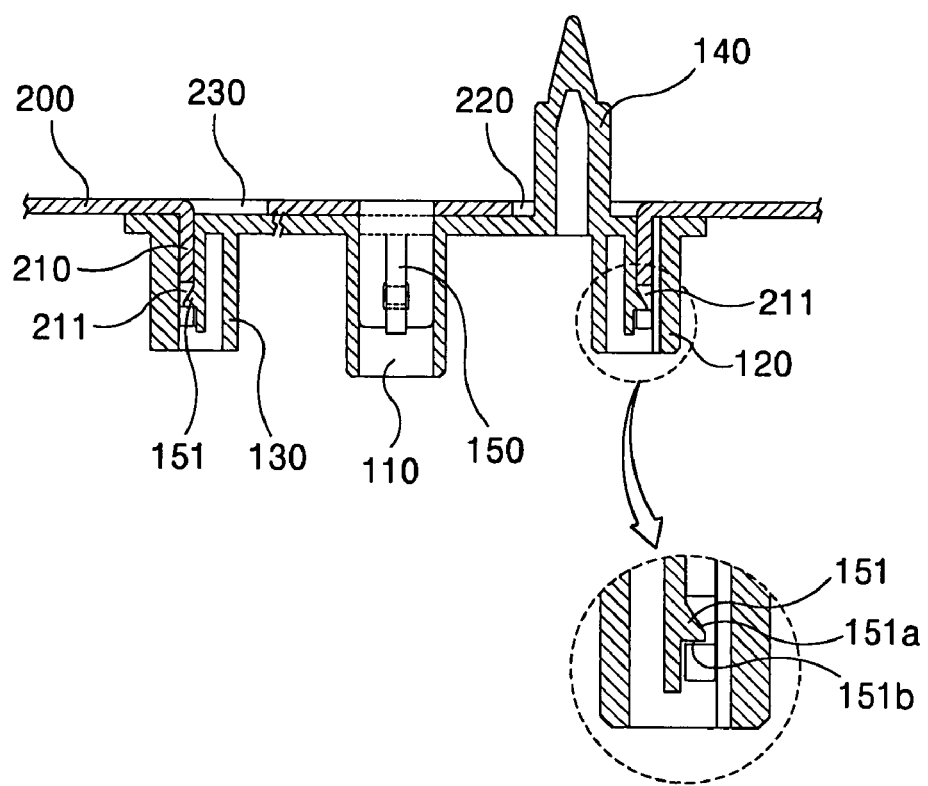
FIG. 9 is a longitudinal section view showing an engagement of a deck and the loading gear supporting member in FIG. 5.

FIG. 5 is a perspective view of a loading gear supporting apparatus of a VCR according to the present invention, FIG. 6 is a plan view showing the loading gear supporting member of FIG. 5, FIG. 7 is a bottom view showing the loading gear supporting member of FIG. 6, FIG. 8 is a sectional view taken along line A–A' of FIG. 6, and FIG. 9 is a longitudinal section view showing an engagement of a deck and the loading gear supporting member in FIG. 5.

As shown, the loading gear supporting apparatus of a VCR according to the present invention is constructed to press-fit a loading gear supporting member 100 to a deck 200 by using elasticity force of the loading gear supporting member (loading assembly) 100. An insertion portion 210 having a locking groove 211 is formed at a predetermined position of the deck 200, and each elasticity portion 150 having a stopping portion 151 is formed in bosses 110, 120, and 130 of the loading gear supporting member 100.

Figure 1:
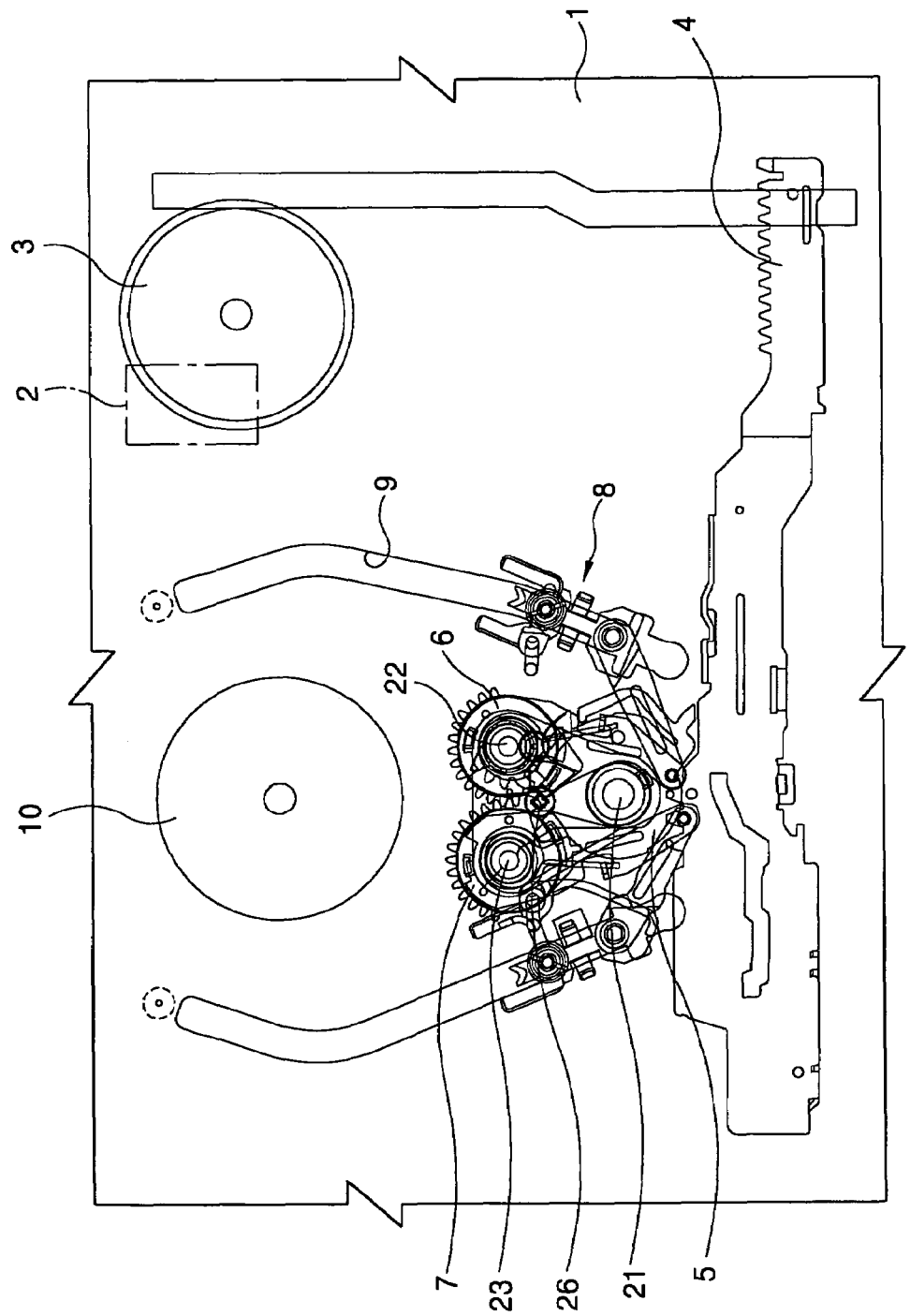
Figure 2:
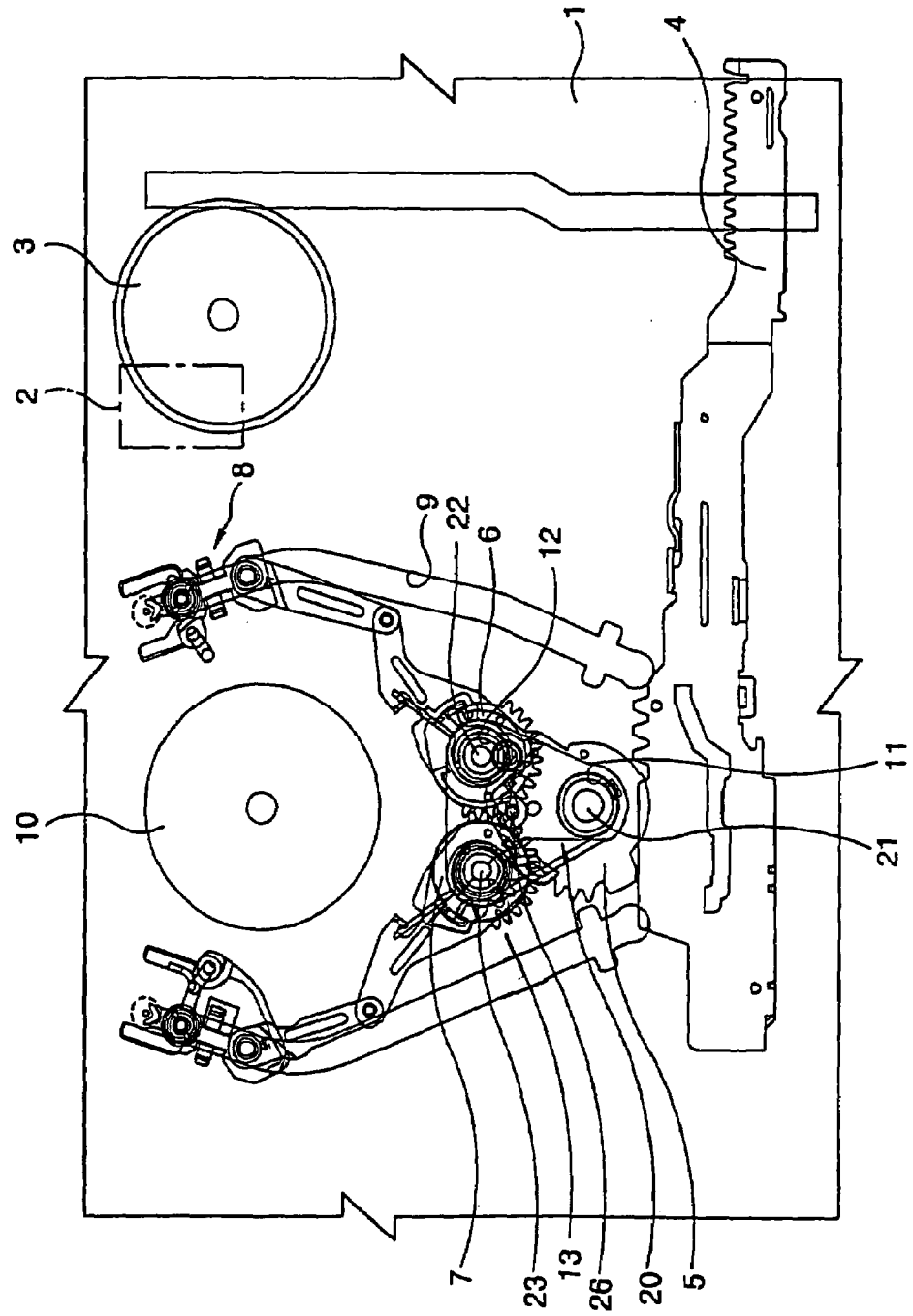
Figure 3:
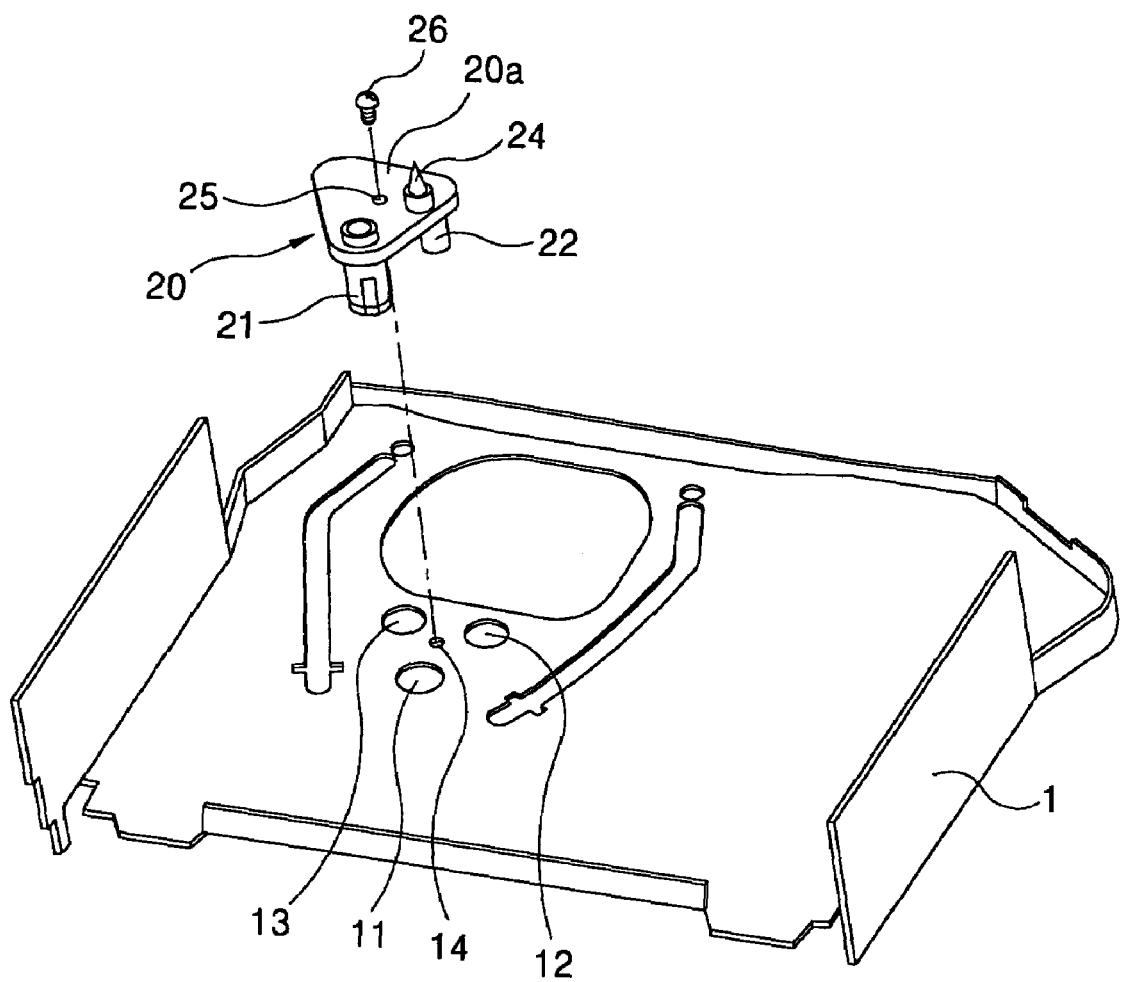
FIG. 3 is a perspective view showing a loading gear supporting member in a loading gear supporting apparatus of a conventional VCR.

More specifically, a cassette tape guide 140 is formed at an upper surface of a base 100a corresponding to a body, and three bosses 110, 120, and 130 which a inner is penetrated thereof formed with predetermined intervals so as to fix (supporting) the pole base loading gear 5 and first and second loading gears 6 and 7 shown in FIGS. 1 and 2.

An elasticity portion 150 is downwardly curved from the base 100a towards an inner side of the bosses 110, 120, and 130. An insertion hole 152 is formed between the elasticity portion and the inner wall of the bosses 110, 120, and 130. Also, a locking protrusion is formed at a middle portion of the elasticity portion so as to be engaged to the locking groove 211 of the insertion portion 210.

The elasticity portion 150 has to be formed with elastic material so as to press-fit the loading gear supporting member to the deck 200, and the locking protrusion 151 has to have a specific shape so that the locking protrusion 151 fitted to the locking groove 21 can not be detached.

That is, an incline plane 151a is formed at an upper surface of the locking protrusion 151 so that the locking protrusion 151 can be smoothly engaged to the locking groove, and a stopping portion 151b is formed at a lower surface of the locking protrusion 151 so as to prevent the locking protrusion 151 engaged to the locking groove 211 from being detached.

Accordingly, if the loading gear supporting member 100 is adhered closely to the lower surface of the deck 200, the insertion portion 210 of the deck 200 is inserted to the insertion hole 152 of the loading gear supporting member 100. At this time, an end part of the insertion portion 210 presses the inclined plane 151a of the locking protrusion 151 and elastically deforms the elastic portion 150. Then, the locking protrusion 151 is engaged to the locking groove 211 at a predetermined position with clack sound.

After the locking protrusion 151 is engaged to the locking groove 211, the locking protrusion 151 is constructed not to be detached from the locking groove 211 by the stopping portion 151b.

An engaging hole 220 and three holes 230 for inserting the cassette tape guide 140 are formed on the upper surface of the deck 200, the insertion portion 210 is extendedly formed at the lower surface of the deck 200 adjacent to the holes 230, and the locking groove 211 is formed at a middle portion of the insertion portion 210.

The insertion portion 210 is formed by cutting a part of the deck 200 and then curving the cut part downwardly. Also, said three holes 230 are formed at a position where the part of the deck 200 is cut so as to form the insertion portion 210.

Figure 4:
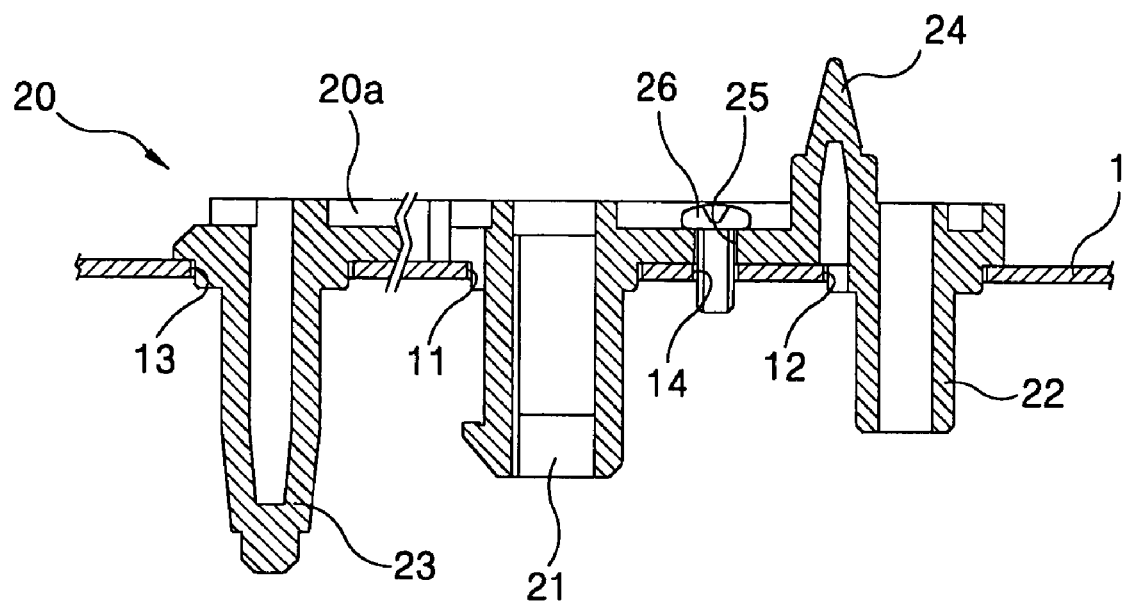
FIG. 4 is a longitudinal section view of FIG. 1.

In the conventional art, the loading gear supporting member was assembled at the upper surface of the deck, the loading gear supporting member was loaded to the engaging holes 11, 12, and 13 of FIG. 4 and then the bosses 21, 22, and 23 of FIG. 4 were inserted.

However, in the present invention, the loading gear supporting member 100 is assemble at the lower surface of the deck 200, the rest hole 230 except the engaging hole 220 for inserting the cassette tape guide 140 is not used to the assembly.

In forming the locking groove 211 formed at the insertion portion 210 of the deck 200 and the locking protrusion 151 of the elastic portion 150 curved-formed at the end part of the base 100a corresponding to a body of the loading gear supporting member 100, one locking groove 211 and one locking protrusion 151 can be formed or the locking groove and the locking protrusion more than two can be formed so as to enhance an engaged force of the loading gear supporting member 100 to the deck.

Also, in a formed position, the locking groove 211 and the locking protrusion 151 can be formed either end parts of the insertion portion 210 and the elastic portion 150 or middle parts of the insertion portion and the elastic portion.

Hereinafter, effects of the loading gear supporting apparatus of a VCR will be explained with reference to the attached drawings.

If the loading gear supporting member 100 is pressed-fit to the lower surface of the deck 200, the cassette tape guide 140 is inserted to the engaging hole 220 and at the same time, the insertion portion 210 of the deck 200 is inserted to the insertion portion 152 of the loading gear supporting member 100.

At this time, if the loading gear supporting member 100 is adhered more closely to the lower surface of the deck 200, the end part of the insertion 210 of the deck 200 presses the inclined plane 151a of the locking protrusion 151 and at the same time elastically deforms the elastic portion 150.

Then, the locking protrusion 151 is engaged to the locking groove 211 at a predetermined position with clack sound and at the same time, the elastic portion 150 comes elastically back to the original position.

At this time, after the locking protrusion 151 is engaged to the locking groove 211, the locking protrusion 151 is constructed not to be detached from the locking groove 211 by the stopping portion 151b.

Under a state that the base 100a of the loading gear supporting member 100 is adhered closely to the lower surface of the deck 200, the insertion portion 210 is fit-inserted to the insertion hole 152 and at the same time, the locking protrusion 151 is engaged to the locking groove 211, so that the loading gear supporting member 100 is firmly engaged to the deck 200 without shaking.

As aforementioned, in the present invention, when the loading gear supporting member is engaged to the deck, the loading gear supporting member is press-fitted to the deck simply by improving the deck and the loading gear supporting member, thereby facilitating the assembly and greatly reducing fabricating time.

Also, according to the present invention, since the loading gear supporting member can be firmly fixed to the deck without forming the boss thickly, the boss is not deformed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A loading gear supporting apparatus of a video cassette recorder comprising:
    a loading gear supporting member having a cassette tape guide at an upper surface of a base so as to be inserted to an engaging hole of a deck and having bosses of which inside is penetrated at a lower surface of the base for fixing (or supporting) a pole base loading gear and first and second loading gears; and
    a loading gear supporting member assembly means for pressed-fitting the boss of the loading gear supporting member to the deck by using elasticity force of the base of the loading gear supporting member,
    wherein the loading gear supporting member assembly means comprises:
        an insertion portion elongated at a lower surface of the deck;
        a locking groove formed at a middle portion of the insertion portion;
        an elasticity portion downwardly curved from the base towards an inner side of the boss so as to be assembled at a lower portion of the deck;
        an insertion hole formed between the elasticity portion and the inner wall of the bosses for inserting the insertion portion of the deck; and
        a locking protrusion formed at a middle portion of the elasticity portion so as to be engaged to the locking groove of the insertion portion.

2. The apparatus of claim 1, wherein the insertion portion is cut from a part of the deck and then curved integrally.

3. The apparatus of claim 1, wherein an incline plane is formed at an upper surface of the locking protrusion so that the elasticity portion is elastically deformed and the locking protrusion is engaged to the locking groove when the locking protrusion of the elasticity portion is engaged to the locking groove of the insertion portion, and a stopping portion is formed at a lower surface of the locking protrusion so as to prevent the locking protrusion engaged to the locking groove from being detached.

4. The apparatus of claim 1, wherein the locking protrusion and the locking groove are formed at end parts of the elasticity portion and the insertion portion.

5. The apparatus of claim 1, wherein a plurality of the locking protrusions and the locking grooves are formed at the elasticity portion and the insertion portion.

\* \* \* \* \*